US011400436B2

(12) United States Patent
Chinzei et al.

(10) Patent No.: US 11,400,436 B2
(45) Date of Patent: Aug. 2, 2022

(54) EXHAUST GAS PURIFICATION CATALYST

(71) Applicants: Isao Chinzei, Toyota (JP); Seiji Nakahigashi, Toyota (JP); Shogo Shirakawa, Toyota (JP); Hiromasa Suzuki, Toyota (JP); Masahide Miura, Toyota (JP); Takahiro Nishio, Toyota (JP); Norimichi Shimano, Toyota (JP); Hiroki Nihashi, Kakegawa (JP); Hiromi Togashi, Kakegawa (JP); Mitsuyoshi Okada, Kakegawa (JP); Takashi Onozuka, Kakegawa (JP); Souta Akiyama, Kakegawa (JP); Isao Naito, Kakegawa (JP)

(72) Inventors: Isao Chinzei, Toyota (JP); Seiji Nakahigashi, Toyota (JP); Shogo Shirakawa, Toyota (JP); Hiromasa Suzuki, Toyota (JP); Masahide Miura, Toyota (JP); Takahiro Nishio, Toyota (JP); Norimichi Shimano, Toyota (JP); Hiroki Nihashi, Kakegawa (JP); Hiromi Togashi, Kakegawa (JP); Mitsuyoshi Okada, Kakegawa (JP); Takashi Onozuka, Kakegawa (JP); Souta Akiyama, Kakegawa (JP); Isao Naito, Kakegawa (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 59 days.

(21) Appl. No.: 17/107,224

(22) Filed: Nov. 30, 2020

(65) Prior Publication Data
US 2021/0197176 A1 Jul. 1, 2021

(30) Foreign Application Priority Data
Dec. 26, 2019 (JP) .............................. JP2019-235839

(51) Int. Cl.
*B01J 21/06* (2006.01)
*B01J 23/10* (2006.01)
*B01J 23/46* (2006.01)
*B01J 23/63* (2006.01)
*B01J 35/00* (2006.01)
*B01D 53/94* (2006.01)

(52) U.S. Cl.
CPC ........ *B01J 23/464* (2013.01); *B01D 53/9413* (2013.01); *B01J 23/10* (2013.01); *B01J 35/0013* (2013.01); *B01D 2255/1025* (2013.01); *B01D 2255/908* (2013.01)

(58) Field of Classification Search
CPC ........ B01J 21/066; B01J 23/10; B01J 23/464; B01J 23/63; B01J 35/0013; B01D 53/9413
See application file for complete search history.

(56) References Cited

U.S. PATENT DOCUMENTS

| 5,147,842 | A | 9/1992 | Funabiki et al. | |
|---|---|---|---|---|
| 6,047,544 | A | 4/2000 | Yamamoto et al. | |
| 6,692,712 | B1 * | 2/2004 | Andersen | B01J 23/63 |
| | | | | 423/239.1 |
| 8,168,560 | B2 | 5/2012 | Taki et al. | |
| 8,337,791 | B2 | 12/2012 | Kohara et al. | |
| 10,099,204 | B2 * | 10/2018 | Hoshino | B01J 23/44 |
| 10,875,010 | B2 * | 12/2020 | Nagaoka | B01J 37/0209 |
| 2006/0189480 | A1 | 8/2006 | Takeshima | |
| 2014/0113810 | A1 * | 4/2014 | Shirakawa | B01J 23/52 |
| | | | | 502/330 |
| 2018/0304238 | A1 | 10/2018 | Saito et al. | |
| 2020/0030775 | A1 * | 1/2020 | Kitamoto | B01J 35/023 |
| 2020/0290019 | A1 | 9/2020 | Onoe et al. | |
| 2020/0391186 | A1 | 12/2020 | Shirakawa et al. | |

FOREIGN PATENT DOCUMENTS

| EP | 2 324 919 A1 | 5/2011 |
|---|---|---|
| JP | 2000-051707 A | 2/2000 |
| JP | 2007038085 A | 2/2007 |
| JP | 2011016090 A | 1/2011 |
| JP | 2014083492 A | 5/2014 |
| JP | 2016147256 A | 8/2016 |
| JP | 2017104825 A | 6/2017 |
| JP | 2017115690 A | 6/2017 |
| JP | 2018-176109 A | 11/2018 |
| WO | 2009/089151 A1 | 7/2009 |
| WO | 2017/159628 A1 | 9/2017 |
| WO | 2017/179679 A1 | 10/2017 |
| WO | 2020/175142 A1 | 9/2020 |

OTHER PUBLICATIONS

U.S. Appl. No. 17/211,112, filed Mar. 24, 2021 in the name of Isao Chinzei et al.

* cited by examiner

*Primary Examiner* — Cam N. Nguyen
(74) *Attorney, Agent, or Firm* — Oliff PLC

(57) ABSTRACT

The present disclosure provides an exhaust gas purification catalyst having an improved low-temperature activity, which comprises a substrate and a catalyst coat layer formed on the substrate, wherein the catalyst coat layer contains Rh fine particles and a promoter comprising a Ce—Zr-based composite oxide and a Zr-based composite oxide not containing cerium oxide, wherein the Rh fine particles have an average particle size measured by a transmission electron microscope observation of 1.0 nm or more to 2.0 nm or less, and a standard deviation σ of the particle size of 0.8 nm or less, and wherein the Rh fine particles are supported on each of the Ce—Zr-based composite oxide and the Zr-based composite oxide not containing cerium oxide.

1 Claim, 5 Drawing Sheets

EXHAUST GAS PURIFICATION CATALYST

CROSS REFERENCE TO RELATED APPLICATIONS

The present application claims priority from Japanese patent application JP 2019-235839 filed on Dec. 26, 2019, the entire content of which is hereby incorporated by reference into this application.

BACKGROUND

Technical Field

The present disclosure relates to an exhaust gas purification catalyst.

Background Art

An exhaust gas discharged from an internal combustion engine of an automobile and the like contains harmful components, such as carbon monoxide (CO), hydrocarbons (HC), and nitrogen oxides (NOx), and the harmful components are purified by an exhaust gas purification catalyst before discharged into the atmosphere. Conventionally, a three-way catalyst that simultaneously performs oxidation of CO and HC and reduction of NOx is used as the exhaust gas purification catalyst, and a catalyst that uses a noble metal, such as platinum (Pt), palladium (Pd), and rhodium (Rh), as a catalyst metal is widely employed as the three-way catalyst.

For the exhaust gas purification catalyst, a ceria-zirconia (Ce—Zr)-based composite oxide or the like is also used as a promoter that has an Oxygen Storage Capacity (OSC) together with a catalyst metal. The OSC material absorbs and releases oxygen to control an air-fuel ratio (A/F) in a micro space, thus providing an effect to suppress reduction of the conversion rate due to a change in exhaust gas composition.

As such an exhaust gas purification catalyst, JP 2014-83492 A discloses an exhaust gas purification catalyst that includes a carrier and a catalyst layer formed on the carrier. In the exhaust gas purification catalyst, in an outermost layer which directly contacts the exhaust gas of the catalyst layer, Rh as a noble metal catalyst is supported on each of a promoter that contains a Ce—Zr-based composite oxide and a promoter that contains a Zr-based composite oxide not containing cerium oxide.

Here, recently, while emission regulations have become stricter, the usage of the noble metals used for the exhaust gas purification catalyst is desired to be reduced from the aspect of the resource risk. Among the noble metals, Rh plays a role in NOx reduction activity, and highly activating Rh provides an expectation of the reduction of the noble metal usage while complying with the emission regulations.

As one method for reducing the usage of the noble metal in the exhaust gas purification catalyst, there has been known a method to use the noble metal by supporting the noble metal as fine particles on a carrier. For example, JP 2016-147256 A discloses a method for manufacturing a catalyst that includes a step of supporting noble metal particles on an oxide carrier to obtain a noble metal supported catalyst and a step of performing a heating process to the noble metal supported catalyst in a reducing atmosphere to control a particle size of the noble metal in a predetermined range. JP 2016-147256 A discloses that the particle sizes of the noble metal particles on the oxide carrier were able to be controlled in a range of 2.8 nm or more to 3.8 nm or less in Examples.

JP 2007-38085 A discloses a method for manufacturing a catalyst that includes a step of causing a reductant to act to a catalyst in which noble metal particles are supported on an oxide carrier, enlarging the noble metal particles having small particle sizes, and obtaining the minimum particle size of the noble metal particles of 1 nm or more. JP 2007-38085 A discloses that the particle sizes of the noble metal particles on the oxide carrier were able to be controlled to 3.0 nm or more to 4.1 nm or less in Examples.

However, for the conventional catalyst that uses Rh fine particles whose particle sizes are controlled, the Rh fine particles are aggregated to be deteriorated during the catalytic reaction, thus failing to provide sufficient durability of the catalyst in some cases.

In addition to them, a support density and a supported part of a catalyst metal have been examined. For example, JP 2017-115690 A discloses an exhaust emission purification device that uses a catalyst in which noble metal support densities on a base layer side and a superficial layer side are controlled. JP 2017-104825 A discloses a catalytic converter that includes a catalyst layer in which a concentration of a noble metal catalyst is uniform and a catalyst layer in which the concentration of the noble metal catalyst is changed from a superficial layer toward a substrate side.

In the conventional exhaust gas purification catalyst, controlling the particle size of Rh fine particles and controlling the support density and the supported part of the catalyst metal have improved the performance to a certain extent. However, for complying with the recent stricter emission regulations, it is required to improve the exhaust gas purification performance of the catalyst with more reduced noble metal amount. Here, since a low-temperature activity of the exhaust gas purification catalyst significantly depends on the noble metal amount, achieving the improved low-temperature activity will provide an expectation of leading to the reduced noble metal usage.

SUMMARY

As described above, for the conventional exhaust gas purification catalyst, it has been required to improve the low-temperature activity to reduce the noble metal usage. Accordingly, the present disclosure provides an exhaust gas purification catalyst having an improved low-temperature activity.

The inventors examined various means to solve the problem, and found that supporting Rh fine particles in which an average particle size and a standard deviation of the particle size are controlled in specific ranges on the entire carrier material ensures improved low-temperature activity to reduce a noble metal usage. Thus, the inventors achieved the present disclosure.

That is, the gist of the present disclosure is as follows.
(1) An exhaust gas purification catalyst comprising a substrate and a catalyst coat layer formed on the substrate, wherein the catalyst coat layer contains Rh fine particles and a promoter comprising a Ce—Zr-based composite oxide and a Zr-based composite oxide not containing cerium oxide, wherein the Rh fine particles have an average particle size measured by a transmission electron microscope observation of 1.0 nm or more to 2.0 nm or less, and a standard deviation σ of the particle size of 0.8 nm or less, and wherein the Rh fine particles are supported on each of the Ce—Zr-based composite oxide and the Zr-based composite oxide not containing cerium oxide.

The present disclosure can provide the exhaust gas purification catalyst having the improved low-temperature activity.

DETAILED DESCRIPTION

Figure 1:
FIG. 1 is a cross-sectional schematic diagram illustrating a first embodiment of an exhaust gas purification catalyst of the present disclosure.

The following describes embodiments of the present disclosure in detail.

An exhaust gas purification catalyst of the present disclosure comprises a substrate and a catalyst coat layer formed on the substrate.

The substrate used for the exhaust gas purification catalyst of the present disclosure is not specifically limited, and a generally used material in a honeycomb shape having multiple cells can be used. The material of the substrate includes a ceramic material having heat resistance, such as cordierite ($2MgO \cdot 2Al_2O_3 \cdot 5SiO_2$), alumina, zirconia, and silicon carbide, and a metal material formed of a metal foil, such as a stainless steel. From the aspect of cost, the cordierite is used in some embodiments.

In the exhaust gas purification catalyst of the present disclosure, the catalyst coat layer contains rhodium (Rh) fine particles (hereinafter also referred to as particle size-controlled Rh fine particles or Rh fine particles), whose average particle size and standard deviation σ of the particle size are controlled to specific ranges, and a promoter. The particle size-controlled Rh fine particles are supported on the entire promoter.

The Rh fine particles have the average particle size of 1.0 nm or more to 2.0 nm or less. In the present disclosure, the average particle size of the Rh fine particles is a number average particle size obtained by directly measuring projected area equivalent diameters based on an image taken in an observation with a transmission electron microscope (TEM) and analyzing particle groups having a cardinal number of 100 or more.

By controlling the average particle size of the Rh fine particles to 1.0 nm or more, the proportion of fine particles having the particle size of less than 1.0 nm, which are considered to be aggregated to cause coarsening during a catalytic reaction, can be reduced. Therefore, the deterioration of the Rh fine particles can be suppressed, thus ensuring the improved catalyst durability. Meanwhile, by controlling the average particle size of the Rh fine particles to 2.0 nm or less, the surface areas of the Rh fine particles can be increased, thus ensuring the improved catalytic activity. The average particle size of the Rh fine particles is 1.1 nm or more in some embodiments, or may be 1.2 nm or more. The average particle size of the Rh fine particles is 1.9 nm or less in some embodiments, or may be 1.8 nm or less or 1.6 nm or less. The average particle size of the Rh fine particles is 1.1 nm or more to 1.9 nm or less in some embodiments, or may be 1.2 nm or more to 1.8 nm or less.

The Rh fine particles have a standard deviation σ of the particle size, which is measured by the transmission electron microscope observation, of 0.8 nm or less. Since the Rh fine particles have the standard deviation σ of the particle size of 0.8 nm or less, the particle size distribution is sharp, and the proportions of the fine particles and the coarse particles are low. Because of the small number of the fine particles, the aggregation of the Rh fine particles during the catalytic reaction is suppressed, thereby suppressing the deterioration of Rh and improving the catalyst durability. Because of the small number of the coarse particles, the surface areas of the Rh fine particles are increased, thereby improving the catalytic activity.

The standard deviation σ of the particle size of the Rh fine particles is 0.7 nm or less in some embodiments, or may be 0.6 nm or less or 0.5 nm or less. While the particle sizes of the Rh fine particles may be monodispersed, the effects of the disclosure can be provided even when the standard deviation a is 0.2 nm or more, 0.3 nm or more, or 0.4 nm or more.

For the Rh fine particles, the proportion of the fine particles having the particle size of less than 1.0 nm is especially reduced. Because of the small proportion of the fine particles having the particle size of less than 1.0 nm, the aggregation of the Rh fine particles during the catalytic reaction is suppressed, thereby suppressing the deterioration of Rh and improving the catalyst durability. For the Rh fine particles, the proportion of the Rh fine particles having the particle size of less than 1.0 nm is 5% by weight or less based on the total weight of the Rh fine particles in some embodiments. This value may be 4% by weight or less, 3% by weight or less, 2% by weight or less, 1% by weight or less, 0.5% by weight or less, 0.3% by weight or less, or 0.1% by weight or less. The Rh fine particles having the particle size of less than 1.0 nm does not have to be contained at all.

In some embodiments, the Rh fine particles have the average particle size of 1.2 nm or more to 1.8 nm or less in the measurement by the transmission electron microscope, and the proportion of the Rh fine particles having the particle size of less than 1.0 nm is 5.0% by weight or less based on the total weight of the Rh fine particles.

In the catalyst coat layer, the particle size-controlled Rh fine particles are supported on the entire promoter that comprises a Ce—Zr-based composite oxide and a Zr-based composite oxide not containing cerium oxide (Ce oxide). That is, the particle size-controlled Rh fine particles are supported on each of the Ce—Zr-based composite oxide and the Zr-based composite oxide not containing cerium oxide. By supporting the particle size-controlled Rh fine particles on each of the Ce—Zr-based composite oxide and the Zr-based composite oxide not containing cerium oxide, the catalyst durability is improved and the low-temperature activity is improved compared with a catalyst in which the particle size-controlled Rh fine particles are supported on any one of them.

In the present disclosure, the Ce—Zr-based composite oxide means a $CeO_2$—$ZrO_2$ compound (referred to as a CZ material or a ZC material, a ceria (cerium oxide)-zirconia-based composite oxide, and the like). The Ce—Zr-based composite oxide may contain an oxide of a metallic element other than Ce or Zr. The metallic element other than Ce or Zr is a rare earth element (note that, Ce is excluded) in some embodiments. The rare earth element can include yttrium (Y), lanthanum (La), praseodymium (Pr), neodymium (Nd), samarium (Sm), europium (Eu), gadolinium (Gd), erbium (Er), ytterbium (Yb), lutetium (Lu), and the like. Among them, the rare earth element is one or more selected from Y, La, Pr, Nd, and Eu in some embodiments. The Ce—Zr-based composite oxide may be an $Al_2O_3$—$CeO_2$—$ZrO_2$ ternary composite oxide (ACZ material) to which $Al_2O_3$ is introduced as a diffusion barrier. The Ce—Zr-based composite oxide is used in a form of a composite oxide with lanthana ($La_2O_3$) and yttria ($Y_2O_3$) in some embodiments. The mixture ratio of ceria to zirconia in the Ce—Zr-based composite oxide is $CeO_2/ZrO_2=0.2$ or more to 4.0 or less based on the weight in some embodiments.

$CeO_2$ contained in the Ce—Zr-based composite oxide has an oxidation number changing to $Ce^{3+}$, $Ce^{4+}$ depending on an oxygen partial pressure of an exhaust gas thereto. $CeO_2$ has a function of absorbing and releasing oxygen to compensate for excess and deficiency of electric charge and a function (OSC) of storing oxygen. In the present disclosure, the Ce—Zr-based composite oxide is used as an OSC material, and absorbs and reduces fluctuation of the exhaust gas atmosphere to ensure keeping the exhaust gas atmosphere to the proximity of a stoichiometric air-fuel ratio.

In the present disclosure, the Zr-based composite oxide not containing cerium oxide may contain an oxide of a metallic element other than Ce or Zr, in addition to $ZrO_2$. The metallic element other than Ce or Zr is a rare earth element (note that, Ce is excluded) in some embodiments. The rare earth element can include yttrium (Y), lanthanum (La), praseodymium (Pr), neodymium (Nd), samarium (Sm), europium (Eu), gadolinium (Gd), erbium (Er), ytterbium (Yb), lutetium (Lu), and the like. Among them, the rare earth element is one or more selected from Y, La, Pr, Nd, and Eu in some embodiments. The Zr-based composite oxide is used in a form of a composite oxide containing lanthana ($La_2O_3$), yttria ($Y_2O_3$), and zirconium in some embodiments.

The Rh fine particles can be supported on the Ce—Zr-based composite oxide and the Zr-based composite oxide not containing cerium oxide by bringing these composite oxides into contact with a Rh fine particle precursor dispersion, which contains Rh fine particle precursors preliminarily controlled in a predetermined particle size distribution, and subsequently performing calcination.

The Rh fine particle precursor dispersion can be manufactured by, for example, any of the following methods.

(1) a method (Method 1) that causes an acidic solution of a Rh compound to react with a basic solution in a reactor in which a clearance of a reaction field is set to a predetermined range; and (2) a method (Method 2) that mixes the acidic solution of the Rh compound with the basic solution to react and subsequently performs a stirring treatment in a high speed mixer.

In Method 1, by the use of the reactor in which the clearance of the reaction field is set to the predetermined range when causing the acidic solution of the Rh compound (for example, inorganic acid salt of Rh) to react with the basic solution (for example, aqueous solution of nitrogen-containing organic compound), the particle size and the particle size distribution of the Rh fine particle precursors (for example, hydroxides of Rh) contained in the obtained dispersion can be controlled.

Clearance adjustment members included in the reactor may be two flat plates, a combination of a flat plate and a wave-shaped plate, narrow tubes, and the like. The clearance of the reaction field can be appropriately set corresponding to a desired particle size and a desired particle size distribution. As the reactor in which the clearance of the reaction field is set to the predetermined range, for example, a micro reactor that includes an appropriate clearance adjustment member is usable.

In Method 2, the acidic solution of the Rh compound (for example, inorganic acid salt of Rh) is reacted with the basic solution (for example, aqueous solution of nitrogen-containing organic compound) to generate the Rh fine particle precursors as particles having large particle sizes, the stirring treatment of the Rh fine particle precursors is performed in the high speed mixer, and a strong shearing force is applied to disperse the Rh fine particle precursors, thereby controlling the average particle size and the particle size distribution of the dispersed Rh fine particle precursors.

The Rh fine particles are supported on each of the Ce—Zr-based composite oxide and the Zr-based composite oxide not containing cerium oxide by bringing the Rh fine particle precursor dispersion prepared as described above into contact with the Ce—Zr-based composite oxide and the Zr-based composite oxide not containing cerium oxide and subsequently performing calcination. Note that supporting the Rh fine particles may be performed simultaneously with the preparation of the catalyst coat layer by mixing the Rh fine particle precursor dispersion with the Ce—Zr-based composite oxide and the Zr-based composite oxide not containing cerium oxide to obtain a slurry, coating the substrate with the slurry, and performing calcination.

The content of the Rh fine particles in the catalyst coat layer is 0.01 g/L or more to 0.7 g/L or less based on the volume of the substrate in some embodiments, or may be 0.1 g/L or more to 0.6 g/L or less. When the content of the Rh fine particles in the catalyst coat layer is 0.01 g/L or more to 0.7 g/L or less, the improved catalyst durability and the reduced Rh usage can be provided at the same time.

The content of the Ce—Zr-based composite oxide in the catalyst coat layer is 1 g/L or more to 75 g/L or less based on the volume of the substrate in some embodiments, or may be 5 g/L or more to 50 g/L or less. When the content of the Ce—Zr-based composite oxide in the catalyst coat layer is 1 g/L or more to 75 g/L or less based on the volume of the substrate, the catalyst durability can be effectively improved.

The content of the Zr-based composite oxide not containing cerium oxide in the catalyst coat layer is 1 g/L or more to 100 g/L or less based on the volume of the substrate in some embodiments, or may be 5 g/L or more to 75 g/L or less.

In the catalyst coat layer, a proportion of the content of the Ce—Zr-based composite oxide relative to the total content of the Ce—Zr-based composite oxide and the Zr-based composite oxide not containing cerium oxide is 10% by weight or more to 60% by weight or less in some embodiments. When the proportion of the content of the Ce—Zr-based composite oxide is within this range, the high OSC ability and the high NOx purification performance can be provided at the same time.

The catalyst coat layer may contain a catalyst metal other than the Rh fine particles. The catalyst metal is a platinum group noble metal other than Rh in some embodiments. The platinum group noble metal includes ruthenium (Ru), palladium (Pd), osmium (Os), iridium (Jr), and platinum (Pt), and Pt is used in some embodiments.

The catalyst coat layer may contain any other component in addition to the Rh fine particles, the Ce—Zr-based composite oxide, and the Zr-based composite oxide not containing cerium oxide. The other component is not specifically limited and includes a metal oxide and the like. When the catalyst coat layer contains the other component, its content is 100 g/L or less based on the volume of the substrate in some embodiments, or may be 50 g/L or less. The Rh fine particles are supported on the other component in some embodiments.

The metal oxide is not specifically limited, and may be an oxide of one or more metals selected from, for example, scandium (Sc), yttrium (Y), lanthanum (La), cerium (Ce), neodymium (Nd), samarium (Sm), europium (Eu), lutetium (Lu), titanium (Ti), zirconium (Zr), and aluminum (Al). As the metal oxide, for example, alumina ($Al_2O_3$) or a composite oxide of $Al_2O_3$ and lanthana ($La_2O_3$) can be used.

In the exhaust gas purification catalyst of the present disclosure, the catalyst coat layer may have one layer, or may have two or more layers. When the catalyst coat layer has two or more layers, the particle size-controlled Rh fine particles and the promoter that comprises the Ce—Zr-based composite oxide and the Zr-based composite oxide not containing cerium oxide only need to be contained in at least one layer of the catalyst coat layer. For example, when the catalyst coat layer has a two-layer structure that includes a lower layer formed on a substrate and an upper layer formed on the lower layer, the effect of the present disclosure is provided when at least one of the upper layer or the lower layer contains the particle size-controlled Rh fine particles supported on the entire promoter.

When the catalyst coat layer has two or more layers, the catalyst coat layer other than the layer containing the particle size-controlled Rh fine particles and the promoter contains a platinum group noble metal as a catalyst metal in some embodiments. The platinum group noble metal includes rhodium (Rh), ruthenium (Ru), palladium (Pd), osmium (Os), iridium (Ir), and platinum (Pt), and Pt is used in some embodiments. This catalyst coat layer may contain the Ce—Zr-based composite oxide, the Zr-based composite oxide not containing cerium oxide, other metal oxides and the like in addition to the catalyst metal.

FIG. 1 illustrates a first embodiment of the exhaust gas purification catalyst of the present disclosure. As illustrated in FIG. 1, an exhaust gas purification catalyst 10 comprises a substrate 11 and a catalyst coat layer 12 formed on the substrate 11. The catalyst coat layer 12 contains particle size-controlled Rh fine particles and a promoter.

Figure 2:
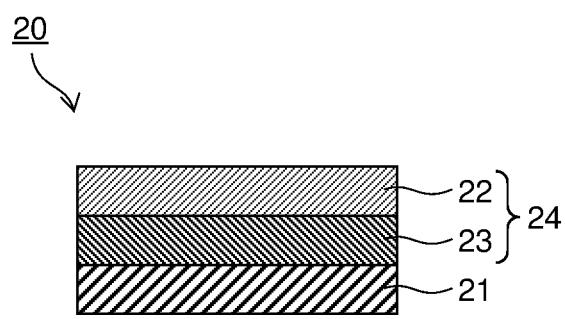
FIG. 2 is a cross-sectional schematic diagram illustrating a second embodiment of the exhaust gas purification catalyst of the present disclosure.

FIG. 2 illustrates a second embodiment of the exhaust gas purification catalyst of the present disclosure. In the second embodiment, the exhaust gas purification catalyst comprises a two-layer catalyst coat layer. As illustrated in FIG. 2, an exhaust gas purification catalyst 20 comprises a substrate 21 and a catalyst coat layer 24 having a two-layer structure formed on the substrate 21. The catalyst coat layer 24 has an upper layer 22 and a lower layer 23. In the second embodiment, it is only necessary that at least one of the upper layer 22 or the lower layer 23 contains the particle size-controlled Rh fine particles and the promoter.

In one embodiment of the exhaust gas purification catalyst of the present disclosure, the upper layer of the catalyst coat layer having the two-layer structure contains the particle size-controlled Rh fine particles and the promoter. This improves the catalyst durability and improves the low-temperature activity of the catalyst. In this embodiment, the upper layer of the catalyst coat layer is formed from a downstream end surface in the exhaust gas flow direction in a range of a length of 70% or more to 100% or less, or 80% or more to 100% or less of the entire length of the substrate in some embodiments, or in a range of the length of 70% or more to 90% or less, or 80% or more to 90% or less in another embodiments. With the upper layer of the catalyst coat layer that contains the particle size-controlled Rh fine particles and the promoter and is formed in this range, the catalyst durability is improved and the activity of the catalyst at low temperature (for example, 250° C.) is improved. In this embodiment, while the lower layer of the catalyst coat layer only needs to be formed from an upstream end surface in the exhaust gas flow direction in a range of the length of 100% or less of the entire length of the substrate, for example, the lower layer is formed from the upstream end surface in the range of the length of 40% or more to 100% or less of the entire length of the substrate in some embodiments, or may be in the range of the length of 60% or more to 100% or less, or 60% or more to 80% or less. The lower layer formed in this range ensures providing the low-temperature activity and the high-temperature activity of the catalyst at the same time.

Figure 3:
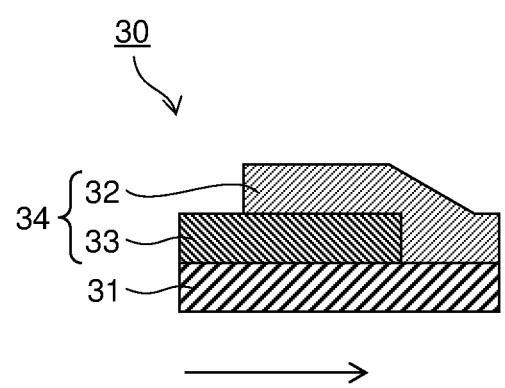
FIG. 3 is a cross-sectional schematic diagram illustrating one embodiment of the exhaust gas purification catalyst of the present disclosure.

FIG. 3 illustrates an embodiment of the exhaust gas purification catalyst of the present disclosure in which the upper layer of the catalyst coat layer having the two-layer structure contains the particle size-controlled Rh fine particles and the promoter. As illustrated in FIG. 3, an exhaust gas purification catalyst 30 comprises a substrate 31 and a catalyst coat layer 34 having a two-layer structure formed on the substrate 31. The catalyst coat layer 34 has an upper layer 32 and a lower layer 33. In this embodiment, the upper layer 32 is formed from the downstream end surface in the exhaust gas flow direction in a predetermined range of the length of the entire length of the substrate, and the lower layer 33 is formed from the upstream end surface in the exhaust gas flow direction in a predetermined range of the length of the entire length of the substrate. In FIG. 3, an arrow indicates the exhaust gas flow direction.

In one embodiment of the exhaust gas purification catalyst of the present disclosure, the lower layer of the catalyst coat layer having the two-layer structure contains the particle size-controlled Rh fine particles and the promoter. Since the exhaust gas, in which the harmful component is partially purified in the upper layer, passes through the lower layer containing the particle size-controlled Rh fine particles, Rh can be effectively used for NOx conversion, thus improving the NOx purification ability of the catalyst to ensure the reduced Rh usage. In this embodiment, the upper layer of the catalyst coat layer is formed from the upstream end surface in the exhaust gas flow direction in a range of the length of 80% or less of the entire length of the substrate in some embodiments, or may be 70% or less, or 50% or less. In this embodiment, the lower layer of the catalyst coat layer is formed from the downstream end surface in a range of the length of 60% or more to 100% or less of the entire length of the substrate in some embodiments.

Figure 4:
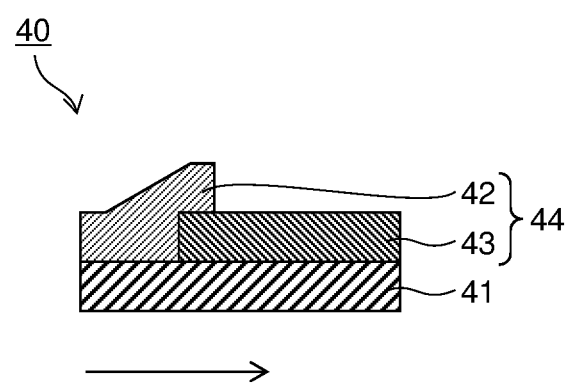
FIG. 4 is a cross-sectional schematic diagram illustrating one embodiment of the exhaust gas purification catalyst of the present disclosure.

FIG. 4 illustrates an embodiment of the exhaust gas purification catalyst of the present disclosure in which the lower layer of the catalyst coat layer having the two-layer structure contains the particle size-controlled Rh fine particles and the promoter. As illustrated in FIG. 4, an exhaust gas purification catalyst 40 comprises a substrate 41 and a catalyst coat layer 44 having a two-layer structure formed on the substrate 41. The catalyst coat layer 44 has an upper layer 42 and a lower layer 43. In this embodiment, the upper layer 42 is formed from the upstream end surface in the exhaust gas flow direction in a predetermined range of the length of the entire length of the substrate, and the lower layer 43 is formed from the downstream end surface in the exhaust gas flow direction in a predetermined range of the length of the entire length of the substrate. In FIG. 4, an arrow indicates the exhaust gas flow direction.

The exhaust gas purification catalyst of the present disclosure can be produced by coating the substrate with a slurry containing the components of the catalyst coat layer by a method known to those skilled in the art. In one embodiment, for example, a slurry containing the particle size-controlled Rh fine particles, a Ce—Zr-based composite oxide, and a Zr-based composite oxide not containing cerium oxide is coated on the substrate using a known method, and drying and calcining are performed at a predetermined temperature for a predetermined time period, thus forming a catalyst coat layer on a substrate.

EXAMPLES

The following further specifically describes the present disclosure using Examples. However, the technical scope of the present disclosure is not limited to Examples.
<Preparation of Catalysts>
Used Raw Material
Material 1: $ZrO_2$: 6% by weight-$La_2O_3$, 10% by weight-$Y_2O_3$ composite $ZrO_2$
Material 2: ZC: 21% by weight-$CeO_2$, 72% by weight-$ZrO_2$, 1.7% by weight-$La_2O_3$, 5.3% by weight-$Y_2O_3$ composite oxide
Material 3: Rh nitrate solution
Material 4: Rh/$ZrO_2$: material in which Rh is supported on the material 1
Material 5: Rh/ZC: material in which Rh is supported on the material 2
Material 6: particle size-controlled Rh dispersion
Material 7: particle size-controlled Rh/$ZrO_2$: material in which Rh of the material 6 is supported on the material 1
Material 8: particle size-controlled Rh/ZC: material in which Rh of the material 6 is supported on the material 2
Substrate: cordierite honeycomb substrate of 875 cc (400 cells square, wall thickness 4 mil)

The material 4 to the material 8 were prepared as follows.
Material 4: Rh/$ZrO_2$ The material 3 was contacted with the material 1, and subsequently calcination was performed, thereby obtaining the material 4 in which Rh was supported on the material 1 in the support amount of 0.2% by weight. The average particle size of the Rh fine particles measured by a transmission electron microscope was 0.7 nm.

Material 5: Rh/ZC

The material 3 was contacted with the material 2, and subsequently calcination was performed, thereby obtaining the material 5 in which Rh was supported on the material 2 in the support amount of 0.2% by weight. The average particle size of the Rh fine particles measured by the transmission electron microscope was 0.7 nm.

Material 6: particle size-controlled Rh dispersion 0.2 g of Rh (III) nitrate of was added in 50 mL of ion exchanged water and dissolved, thereby preparing an acidic solution (pH 1.0) of the Rh compound.

An aqueous tetraethylammonium hydroxide solution (concentration 175 g/L, pH 14) was prepared as an organic base solution.

Using a reactor (micro reactor) that included two flat plates as the clearance adjustment members, with a method of introducing the acidic solution of the Rh compound and the organic base solution into a reaction field in which the clearance was set to 10 μm, both liquids were reacted under a condition in which a mole ratio (TEAH/RN) of tetraethylammonium hydroxide (TEAH) to Rh nitrate (RN) was 18 to prepare a Rh fine particle precursor dispersion. The obtained Rh fine particle precursor dispersion had pH 14. The median diameter (D50) of the Rh fine particle precursors contained in the obtained Rh fine particle precursor dispersion was measured by a dynamic light scattering method (DLS), and the median diameter (D50) was 2.0 nm.

Material 7: particle size-controlled Rh/$ZrO_2$

The material 6 was contacted with the material 1, and subsequently calcination was performed, thereby obtaining the material 7 in which Rh was supported on the material 1 in the support amount of 0.2% by weight. The average particle size of the Rh fine particles measured by the transmission electron microscope was 1.4 nm, and the standard deviation a of the particle size was 0.48 nm.

Material 8: particle size-controlled Rh/ZC

The material 6 was contacted with the material 2, and subsequently calcination was performed, thereby obtaining the material 8 in which Rh was supported on the material 2 in the support amount of 0.2% by weight. The average particle size of the Rh fine particles measured by the transmission electron microscope was 1.4 nm, and the standard deviation a of the particle size was 0.48 nm.

Example 1

The material 6 having the Rh amount of 0.45 g/L and subsequently the material 1 were added to distilled water in this order while stirring them, and subsequently stirring was performed for 10 minutes. Subsequently, the material 1 and an $Al_2O_3$-based binder were added and stirring was performed for about 10 minutes. Subsequently, the material 2 was added and stirring was performed for about 10 minutes, thereby preparing a slurry in which these materials were suspended. Subsequently, the prepared slurry was poured into a substrate, and an unnecessary portion was blown off by a blower, thus coating a wall surface of the substrate with the materials. The coat amount was adjusted such that the material 1 was 50 g/L and the material 2 was 30 g/L based on the volume of the substrate. Finally, drying was performed by a dryer at 120° C. for two hours, and subsequently, calcination was performed by an electric furnace at 500° C. for two hours, thus preparing a catalyst coat layer on the substrate. In the catalyst coat layer, the particle size-controlled Rh was supported on each of $ZrO_2$ as the material 1 and ZC as the material 2. By the measurement with the transmission electron microscope, the average particle size of the Rh fine particles was 1.4 nm and the standard deviation σ of the particle size was 0.48 nm.

Comparative Example 1

The catalyst of Comparative Example 1 was prepared similarly to Example 1 except that the material 2 and the material 6 were substituted with the material 5.

Comparative Example 2

The catalyst of Comparative Example 2 was prepared similarly to Example 1 except that the material 2 and the material 6 were substituted with the material 8.

Comparative Example 3

The catalyst of Comparative Example 3 was prepared similarly to Example 1 except that the material 1 and the material 6 were substituted with the material 4.

Comparative Example 4

The catalyst of Comparative Example 4 was prepared similarly to Example 1 except that the material 1 and the material 6 were substituted with the material 7.

Comparative Example 5

The catalyst of Comparative Example 5 was prepared similarly to Example 1 except that the material 6 was substituted with the material 3. The average particle size of the Rh fine particles measured by the transmission electron microscope was 0.7 nm.

<Durability Test>

The durability test was performed for each of the prepared exhaust gas purification catalysts of Example 1 and Comparative Examples 1 to 5 using an actual engine. Specifically, the durability test was performed as follows. The exhaust gas purification catalysts were each installed to an exhaust system of a V-type eight-cylinder engine, exhaust gases in respective stoichiometric and lean atmospheres were repeatedly flown for a certain period of time (a ratio of 3:1) at a catalyst bed temperature of 900° C. for 50 hours.

<Performance Evaluation>

The exhaust gas purification catalysts on which the durability test had been performed were each installed to an exhaust system of a L-type four-cylinder engine, the exhaust gas having air-fuel ratio (A/F)=14.4 was supplied, and the temperature was increased at the catalyst bed temperature 200° C. to 600° C. (20° C./minute) under the condition of Ga=35 g/s. The temperature (NOx 50% conversion temperature) when the NOx conversion rate was 50% was measured, and the low-temperature activity was evaluated. The lower this value is, the higher the low-temperature activity is.

Figure 5:
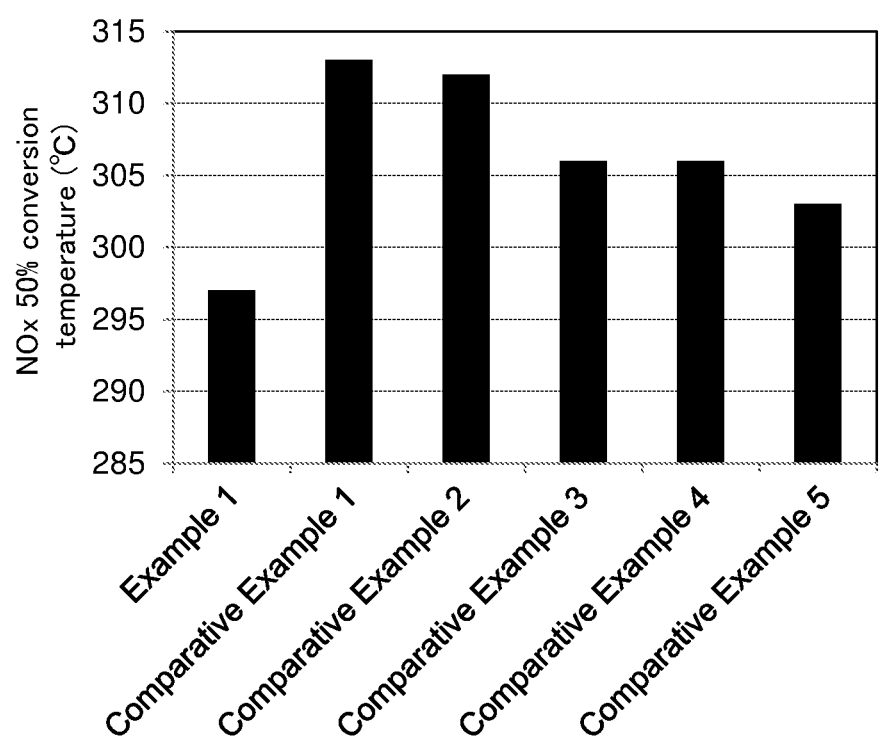
FIG. 5 is a graph illustrating NOx 50% conversion temperatures of catalysts of Example 1 and Comparative Examples 1 to 5.

Table 1 indicates the details of the Rh fine particles and the NOx 50% conversion temperatures of Example 1 and Comparative Examples 1 to 5. In Table 1, the columns of the Rh fine particles indicate the Rh types used for preparing the Rh fine particles. FIG. 5 illustrates the NOx 50% conversion temperatures of the catalysts of Example 1 and Comparative Examples 1 to 5.

From Table 1 and FIG. 5, when the Rh fine particles were supported on any one of $ZrO_2$ or ZC, the NOx 50% conversion temperatures were equivalent between the catalysts in which the particle size-controlled Rh fine particles were used and the catalysts in which the Rh fine particles whose average particle size was out of the predetermined range of the present disclosure were used (comparison between Comparative Example 1 and Comparative Example 2, comparison between Comparative Example 3 and Comparative Example 4). However, when the particle size-controlled Rh fine particles were supported on each of $ZrO_2$ and ZC, the NOx 50% conversion temperature significantly decreased and the low-temperature activity of the catalyst was improved compared with the catalyst in which the Rh fine particles whose average particle size was out of the predetermined range of the present disclosure were used (comparison between Example 1 and Comparative Example 5). Accordingly, it was shown that the effect of improving the low-temperature activity of the catalyst obtained by controlling the particle size of the Rh fine particles within the predetermined range was an effect specifically obtained when the particle size-controlled Rh fine particles were supported on each of $ZrO_2$ and ZC.

All publications, patents, and patent applications cited herein are incorporated herein by reference in their entirety.

DESCRIPTION OF SYMBOLS

10 Exhaust gas purification catalyst
11 Substrate
12 Catalyst coat layer
20 Exhaust gas purification catalyst
21 Substrate
22 Upper layer
23 Lower layer
24 Catalyst coat layer
30 Exhaust gas purification catalyst
31 Substrate
32 Upper layer
33 Lower layer
34 Catalyst coat layer
40 Exhaust gas purification catalyst
41 Substrate
42 Upper layer
43 Lower layer
44 Catalyst coat layer

TABLE 1

|  | Rh fine particles | Rh fine particles Average particle size (nm) | Rh fine particles Standard deviation σ (nm) | Supporting method | NOx 50% conversion temperature (° C.) |
|---|---|---|---|---|---|
| Example 1 | Particle size-controlled Rh | 1.4 | 0.48 | Entirely supported | 297 |
| Comparative Example 1 | Rh nitrate | 0.7 | — | Supported on ZC material | 313 |
| Comparative Example 2 | Particle size-controlled Rh | 1.4 | 0.48 | Supported on ZC material | 312 |
| Comparative Example 3 | Rh nitrate | 0.7 | — | Supported on $ZrO_2$ | 306 |
| Comparative Example 4 | Particle size-controlled Rh | 1.4 | 0.48 | Supported on $ZrO_2$ | 306 |
| Comparative Example 5 | Rh nitrate | 0.7 | — | Entirely supported | 303 |

What is claimed is:

1. An exhaust gas purification catalyst comprising:
a substrate; and
a catalyst coat layer formed on the substrate,
wherein the catalyst coat layer contains Rh fine particles and a promoter comprising a Ce—Zr-based composite oxide and a Zr-based composite oxide not containing cerium oxide,
wherein the Rh fine particles have an average particle size measured by a transmission electron microscope observation of 1.0 nm or more to 2.0 nm or less, and a standard deviation $\sigma$ of the particle size of 0.8 nm or less, and
wherein the Rh fine particles are supported on each of the Ce—Zr-based composite oxide and the Zr-based composite oxide not containing cerium oxide.

* * * * *